United States Patent [19]
Holmberg

[11] Patent Number: 5,641,459
[45] Date of Patent: Jun. 24, 1997

[54] MACHINE FOR SYNTHESIZING OLIGONUCLEOTIDES

[75] Inventor: Lars Holmberg, Upsala, Sweden

[73] Assignee: Pharmacia Biotech AB, Upsala, Sweden

[21] Appl. No.: 516,272

[22] Filed: Aug. 17, 1995

[51] Int. Cl.$^6$ .................. B01J 10/00; G05D 7/00
[52] U.S. Cl. .................. 422/134; 422/103; 422/108; 422/112; 422/116; 436/86; 436/89
[58] Field of Search .................. 422/134, 131, 422/103, 112, 108, 116; 436/86, 89

[56] References Cited

U.S. PATENT DOCUMENTS

| | | | |
|---|---|---|---|
| 4,353,989 | 10/1982 | Bender et al. | 435/287 |
| 4,362,699 | 12/1982 | Verlander et al. | 422/131 |
| 4,483,964 | 11/1984 | Ureda et al. | 525/54.11 |
| 4,517,338 | 5/1985 | Ureda et al. | 525/54.11 |
| 4,671,941 | 6/1987 | Niina et al. | 422/131 |
| 5,252,296 | 10/1993 | Zuckermann et al. | 422/116 |
| 5,316,954 | 5/1994 | Hupe et al. | 436/89 |
| 5,368,823 | 11/1994 | McGraw et al. | 422/134 |
| 5,380,495 | 1/1995 | Chang et al. | 422/131 |
| 5,405,585 | 4/1995 | Coassin | 422/100 |
| 5,413,762 | 5/1995 | Hirano et al. | 422/70 |
| 5,447,692 | 9/1995 | Keenan et al. | 422/116 |

*Primary Examiner*—Nina Bhat
*Attorney, Agent, or Firm*—Hale and Dorr

[57] ABSTRACT

A machine for synthesizing oligonucleotides has individual pumping modules for connection to each of a number of different monomers and to other fluids used in the synthesizing process. Each pumping module includes a pump and a three-port/three-way valve with the first inlet port connected to receive the fluid, and the second port connected to receiving a flushing agent, such as acetonitrile. A valving arrangement downstream from the pumping modules selects a monomer. The selected monomer and other fluids pass through flow sensors which provides signals to a controller, which uses these signals to regulate the pumping of the pumps. At least some of the valves allow multiple inlet ports to be kept open at the same time, thus allowing certain of the liquids to be mixed within the valves. The various pumps, valves and sensors are mounted to the exterior of a cabinet and arranged such that the liquid handling portions are exterior to the cabinet, while electrical portions are within the cabinet. Air is continuously purged within the cabinet in order to prevent the introduction of solvent fumes near electrical components. The machine can produce up to 100 millimoles of oligonucleotides, and the arrangement provides for the efficient use of materials.

20 Claims, 4 Drawing Sheets

MACHINE FOR SYNTHESIZING OLIGONUCLEOTIDES

FIELD OF THE INVENTION

This invention relates to a machine for synthesizing oligonucleotides.

BACKGROUND OF THE INVENTION

An oligonucleotide is a macromolecule comprising a sequence of nucleosides, each of which includes a sugar and a base. Each nucleoside is separated from adjacent nucleosides with an internucleoside linkage, which effectively serves to bond the nucleosides together. The sugar is generally a pentose, most commonly a deoxyribose, ribose, or 2'-0-substituted ribose. A number of different bases can be used, the four most common of which are adenine, cytosine, guanine, and thymine (abbreviated as A, C, G, and T, respectively). The internucleoside linkage is most commonly a phosphate, which may be substituted with a variety of substituents at a nonbridging oxygen atom, most commonly by sulphur or an alkyl, ester, or amide group.

Different methods are used for synthesizing oligonucleotides, including phosphoramidite, phosphotriester, and H-phosphonate methods, each of which is generally known in the field of molecular biology. The phosphoramidite method is described here as an exemplary method. To produce a large number of oligonucleotide molecules with this method, a solid support is provided in a reaction vessel and a large number of DMT-protected nucleosides are fixed to the support. A deprotectant, acting through a detritylation mechanism, is added to remove the DMT from nucleoside, and thus to "deprotect" that one hydroxyl. As a result, the last nucleoside in the sequence has one hydroxyl that is ready to receive a next amidite. Nucleoside phosphoramidites (hereafter "amidites"), dissolved in a solvent such as acetonitrile (ACN), are introduced into the vessel. An activator, such as tetrazole, is also introduced into the vessel with the amidites. The phosphorus in the amidites bonds with the oxygen in the hydroxyl, thus providing support-bound nucleotides. After the support-bound nucleotides are formed, excess amidites are flushed from the vessel with ACN.

An oxidizing agent is added to convert the trivalent phosphorous to pentavalent. After the oxidizing agent is flushed, a capping agent is added to block all the unprotected hydroxyls from reacting with amidites introduced at a later stage. ACN is again introduced to flush out the capping agent.

These steps are repeated a number of times to produce growing, oligonucleotide chains from support-bound nucleosides. Each of the chains should have an identical repeating sequence of nucleosides.

This method (and others) for producing oligonucleotides are time consuming and the materials that are used, particularly the amidites, are expensive and require special handling and disposal after being used. In laboratories, oligonucleotides are synthesized on a scale of about one micromole. One group of machines produced under the name OligoPilot (a trademark of the assignee of the present invention) has improved the process to produce as much as 3–4 millimoles of oligonucleotides. It would be desirable to increase the number of oligonucleotides that can be produced at one time, and to do so efficiently.

In larger quantities, however, the production of oligonucleotides raises several concerns. Because of the interest in using synthesized oligonucleotides for human use, the oligonucleotides must have a high degree of homogeneity. Meanwhile, competing concerns affect the efficient use of materials, particularly the amidites and the ACN. While an excess amount of amidites is needed to ensure that as many as possible of the nascent oligonucleotides react with newly introduced amidites, the quantity of amidites introduced into the vessel should not be too excessive and wasteful. It is also desirable to reduce the amount of ACN that is used, while still flushing out, or at least diluting, leftover amidites as much as possible. If the flushing is insufficient, leftover amidites in the vessel or in various conduits leading to the column can produce nonhomogeneous sequences.

The machine known as the OligoPilot II (also a trademark of the assignee of the present invention) uses a flow-through design in which various conduits, pumps, and valves are constantly filled with liquid. Liquid introduced into a vessel (called a "column" in a flow-through device) displaces previously introduced liquid. This flow-through system is distinguished from a "batch" system in which liquids are introduced into a reaction vessel, the introduced liquids are flushed out, and the steps of introducing and flushing liquids is repeated. In such a batch device, the liquids are provided to the vessel by gas pressure and not with pumps. This approach can be used because a batch process has gaps in the flow of fluid.

In the OligoPilot II machine, first and second eight-way valves, each having eight individually selectable inlet ports, have output ports coupled to inlet ports of a first three-port valve of the type in which one and only one of the inlet ports must be kept open. Each of the two eight-way valves has four inlet ports coupled to receive one of four different types of amidites, and four inlet ports coupled to receive ACN (the flushing agent).

The outlet port of the first three-port valve is coupled to a first inlet port of a second three-port valve of the same type as the first. A second inlet port to this second three-port valve is coupled to a third eight-way valve that has various inputs including ACN, oxidizing agents, capping agents, and activator. The outlet port of the second three-way valve is provided to a valve that is coupled to an inlet side of a reagent pump for pumping liquid to the column through valve at the outlet side of the reagent pump. This last valve is also coupled to two pumps that are dedicated to pumping deprotectant and ACN at a higher flow rate than the reagent pump.

Liquids output from the column are provided through the valve at the pump's inlet side, to a monitor for detecting absorption of light to sense displaced trityl groups, and then to a waste valve that receives one input and has a number of separate outputs for waste. By selecting certain ports on the valves on the inlet and outlet sides of the reagent pump, the liquid can be circulated through the column for a desired time.

In the OligoPilot II machine, to introduce a next amidite into the column, one of the eight-way valves is set to receive a next amidite while another of the eight-way valves is set to receive the activator. The eight-way valves receiving the activator and the amidite are pulsed back and forth to introduce quantities of each alternatively.

To regulate the amounts of the liquids that are provided to the column, each of the pumps is initially calibrated. During operation, the pumps are activated a certain period of time to provide the desired quantities of liquid. Periodically, the pumps must be rechecked and recalibrated to avoid problems that can result from drifting in the pump. For the scale of synthesis involved, such flow calibration is sufficiently accurate for controlling the quantities of reagents delivered to the column. For larger scale synthesis, however, there is a need for more sophisticated means for controlling the delivery of the liquids.

SUMMARY OF THE INVENTION

According to the present invention, an improved machine for synthesizing oligonucleotides provides superior control and efficiency over prior flow-through machines. The machine receives a number of different liquids, including different amidites and typically other agents such as capping agents, oxidizing agents, and activator. Each of the liquids is associated with a respective pumping module that includes a valve and a pump. In preferred embodiments, flow rate sensors are provided at several locations to measure volumes of activator, amidites, ACN, capping agents, and oxidizing agents. The signals provided to the controller from these sensors are used to regulate the pumps individually during operation. The valves in the modules are also coupled to receive a flushing agent.

The machine of the present invention allows each of the amidites and other liquids coupled to the machine to be individually controlled. This control is efficiently monitored with flow sensors that are used to regulate pump flow such that the amount of amidite that is used is about 1.5 molar equivalents, i.e., a volume of liquid that has 1.5 times as many amidites as the number of sequences being produced in a column.

To provide increased safety, all liquids are handled in the exterior of a cabinet, while the cabinet houses electrical components. In the cabinet, air is consistently circulated and purged to prevent solvent fumes from entering the interior where sparks may be formed.

The present invention allows for close control of the volumes of liquid that are introduced. The control system avoids the need to recalibrate due to drifting because the valves are regulated during operation. By using three-way valves in which one, both, or neither of the inlet ports can be open at one time, different capping agents can be mixed together in the valve; the activator and amidites also can be simultaneously introduced and mixed. Other features and advantages will become apparent from the following detailed description, drawings, and claims.

DETAILED DESCRIPTION

The present invention features a flow-through machine for accurate, large-scale, efficient synthesis of oligonucleotides in quantities on the order of 100 millimoles, an amount much higher than previously possible. The machine has a number of pumps and valves, each corresponding to one of a number of different types of liquids to be introduced, including a number of different amidites, as well as other agents for flushing, activating, capping, oxidizing, and deprotecting. Sensors are provided to meter the flow of liquid, and the sensed flow is used to regulate the pumps.

Figure 1:
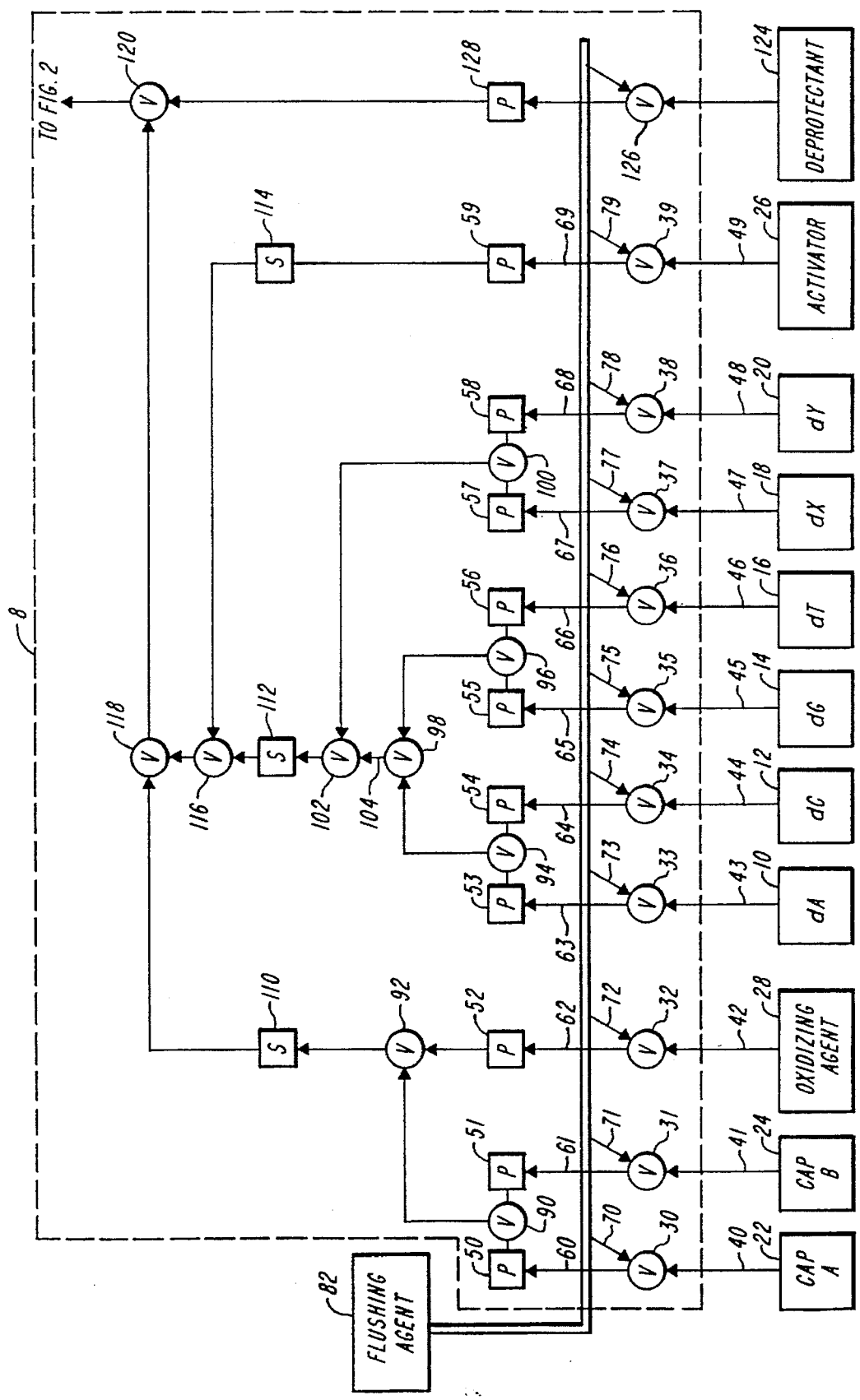
FIGS. 1 and 2 are block diagrams of a synthesizing machine according to the present invention.

Referring to FIG. 1, a machine 8 for synthesizing oligonucleotides has inlet ports for fluidly receiving liquid from a number of containers that hold different types of liquids, and an outlet port for providing selected liquids to a column. While described here in connection with a phosphoramidite method for synthesizing oligonucleotides, machine 8 can be used with other methods for synthesizing oligonucleotides.

The four most commonly used amidites, which are the monomers used in the phosphoramidite method, are kept separately in containers 10, 12, 14, and 16, respectively. These amidites have a deoxyribose sugar, and therefore the amidites are deoxyadenosine, deoxycytidine, deoxyguanosine, and deoxythymidine, known as dA, dC, dG, and dT, respectively. Other amidites that may be used, referred to here as dX and dY, are kept in containers 18 and 20. All of the amidites are dissolved in ACN.

Other agents are also kept in separate containers. Capping agents, represented as Cap A and Cap B, are kept in containers 22 and 24; an activator, preferably tetrazole, is kept in container 26; an oxidizing agent is kept in container 28; and a deprotectant, preferably a detritylation agent, is in container 124. In the case of the oxidizing agent, two added valves and pumps can be used to select between two different types of oxidizing agents, one used for the formation of phosphodiester linkages, and the other for the formation of phosphorothioate linkages.

Each container 10–28 is fluidly coupled to a first inlet port of one of valves 30–39 (not in respective order) through respective conduits 40–49. Valves 30–39 are preferably three-port/three-way valves, i.e., each has three ports, typically one outlet port and two inlet ports, such that one, both, or neither of the inlet ports can be kept open. A second inlet port for each valve 30–39 is fluidly coupled through a respective conduit 70–79 to a conduit 80 that carries ACN from a flushing agent container 82. Each of valves 30–39 is fluidly coupled at its outlet port to a respective pump 50–59 through a conduit 60–69. Each of the liquids that is introduced is thus associated with an individual pumping module that includes a pump and a valve.

The modules are coupled downstream through a valving arrangement that is controlled to select liquids for introduction to the column. The outlet ports of pumps 50 and 51, which receive Cap A and Cap B, are fluidly coupled to the inlet ports of valve 90, the output port of which is fluidly coupled to a first inlet port of a valve 92. When capping agent is to be introduced, both inlet ports of valve 90 are typically kept open at the same time to combine the capping agents in equal amounts. The second inlet port of valve 92 receives an oxidizing agent from the output of pump 52. Accordingly, valve 92 can selectively provide one of a combination of Cap A and Cap B, an oxidizing agent, and ACN.

Pumps 53–58, which are fluidly coupled to receive dA, dC, dG, dT, dX, and dY, respectively, are paired together, and the outlets of these pumps are fluidly coupled to a part of the valving arrangement for selecting one of the amidites (or ACN) for introduction to the column. The outlet ports of pumps 53 and 54 are fluidly coupled to the inlet ports of a valve 94, and the outlet ports of pumps 55 and 56 are fluidly coupled to the inlet ports of a valve 96. The outlet ports of valves 94 and 96 are fluidly coupled to the inlet ports of a valve 98, which, in turn, provides ACN or one of amidites dA, dC, dG, and dT to a first inlet port of valve 102. Pumps 57 and 58, which selectively pump dX and dY are fluidly coupled to a valve 100, which provides at its outlet port a liquid to a second inlet port of valve 102. The outlet port of valve 102 thus provides one of the six amidites or ACN. Because one amidite is provided at one time, valves 94-102 generally have only one of the inlet ports open at one time.

Pump 59 for pumping an activator, preferably tetrazole, from container 26 is not paired with another pump.

The liquids output from valve 92, valve 102, and pump 59 are provided to a respective flow sensor 110, 112, and 114. These sensors are preferably each turbine flow meters, such as a Model FTO-3 produced by EG&G/Amtele AB, which have a rotating turbine for carefully metering a volume of fluid flow. The flow meters provide signals to a controller, which uses these signals to regulate pumps 50-59.

The amidite or ACN flowing through sensor 112 and the activator or ACN flowing through sensor 114 are provided to the inlet ports of valve 116. Because valve 116 is a three-way valve and can receive fluids at two inlet ports simultaneously, when an amidite is provided from valve 102 and activator is provided from sensor 114, these liquids can be mixed together within valve 116. The liquid flowing through sensor 110 is coupled to a first inlet port of valve 118, which receives at a second inlet port the liquid from the outlet port of valve 116. Only one of the inlet ports to valve 118 is typically open at one time if one is open at all.

The outlet port of valve 118 is fluidly coupled to a first inlet port of a valve 120. The second inlet port of valve 120 receives either ACN from container 82 or deprotectant from container 124. The ACN and the deprotectant are each provided to a pumping module that includes a valve 126 and a pump 128. The outlet port of pump 128 is fluidly coupled to the second inlet port of valve 120. Pump 128 is generally similar in design to pumps 50-59, but has a flow rate that is ten times greater than that of any of pumps 50-59.

The liquid from the outlet port of valve 120 is provided to a piezoelectric pressure transmitter 140, which senses the pressure in the liquid and provides to the controller an electrical signal that indicates the pressure of the flowing liquid.

The liquid is then provided to an ultrasonic air sensor 142 that has a sensor unit disposed in the conduit that carries the liquid, and a control unit coupled to the sensor unit. The air sensor continuously monitors the liquid to sense bubbles or gaps in the liquid in the conduit. Such bubbles or gaps should not occur in a flow-through system; rather, the various conduits should always have liquid in them. If bubbles are sensed, the flow of liquid can be shut off to prevent air from entering the column downstream, and an alarm is sounded.

The liquid is next provided to a UV monitor and transmitter 144. The monitor is preferably a Model UV-M/1, and the UV-transmitter is preferably a Model UV-P. Each of these models is distributed by the assignee of the present invention. The monitor has a light source for providing light, a filter for providing light at a first selected wavelength, and a light detector that senses an amount of UV absorption. The wavelength is selected so that UV absorption indicates the amount of nucleosides in the liquid. The monitor provides analog signals to the transmitter, which has high resolution analog/digital converters to convert the analog signals into digital information for use by a controller.

The liquid from UV monitor and transmitter 144 is then provided to a valve 146 which has a first outlet port 147 for coupling to a flow-through column 151 where the oligonucleotides are produced, and a second outlet port 148 that can be used to bypass column 151 during tests or during start-up when all the liquids conduits are being primed.

As indicated above, there are a number of steps in which liquids must be flushed out of column 151 (or at least sufficiently diluted). Consequently, provision is made to receive and monitor the liquids provided from these flushing processes. Column 151 is coupled to an inlet port of a valve 150, which receives the liquid displaced from column 151 when new liquid is introduced to the column. A second inlet port of valve 150 is coupled to outlet port 148 of value 146 for bypassing column 151 when desired.

The displaced liquid is provided at the outlet port of valve 150 to first and second UV monitors and transmitters 152, 154. These two are of the same general type as UV monitor and transmitter 144. Monitor and transmitter 152 uses the same wavelength as monitor and transmitter 144 to detect nucleosides displaced from column 151. By receiving signals from UV monitors and transmitters 144 and 152, the controller can determine the amount of nucleosides introduced into and displaced from column 151, and therefore can determine the difference that is left in the column due to reaction with the nascent oligonucleotide.

UV monitor and transmitter 154 uses a second selected wavelength (which could be in the visible range and not the ultraviolet), different from the first, for sensing the amount of DMT that is removed by the deprotectant. When the deprotectant is introduced and the amount of DMT sensed by monitor and transmitter 154 exceeds a first threshold, it indicates a start of a deprotectant cycle. When the sensed amount of DMT then falls below a second threshold, the controller determines that the deprotectant cycle is finished. While this process leaves an amount of deprotectant in the lines between the column and valve 120 (FIG. 1), this amount is small relative to the volume of the column. The sensing done by monitor and transmitter 154 could be performed with a conductivity sensor.

After the UV monitors and transmitters, the liquid passes through flow sensor 156. In addition to generally sensing displaced liquid flow, sensor 156 is also used to regulate the flow of pump 128. Sensor 156 is generally similar to sensors 110, 112, and 114, but preferably is a Model FT4-8, which accommodates a larger quantity of liquid flow.

From flow sensor 156, the liquid is provided to a back pressure valve, and then to a first waste valve 160. Valve 160 has a single inlet port and two outlet ports, the first of which is provided as a waste output, and the second of which is provided to a second waste valve 162. Valve 162 also has two outlet ports. Accordingly, the combination of valves 160 and 162 provide three separate outputs for waste that results from the flushing of the column. This separation is useful because the different waste liquids have different requirements for handling and disposal.

Each of the valves described above is preferably a pneumatically actuated three-port/three-way diaphragm valve, preferably a model produced by Robolux AB, located in Lidingo, Sweden. The air valves for providing the pneumatic drive that controls the valves are controlled by solenoid valves that are coupled to the controller. Each of the pumps is preferably a vane pump with a magnetic coupling drive, produced by Castor, located in Italy. Most pumps are a Model MPA114AP, with a capacity of 3-48 liters per hour, and pump 128 is a Model MPA116AP with a capacity of 30-480 liters per hour.

Figure 3:
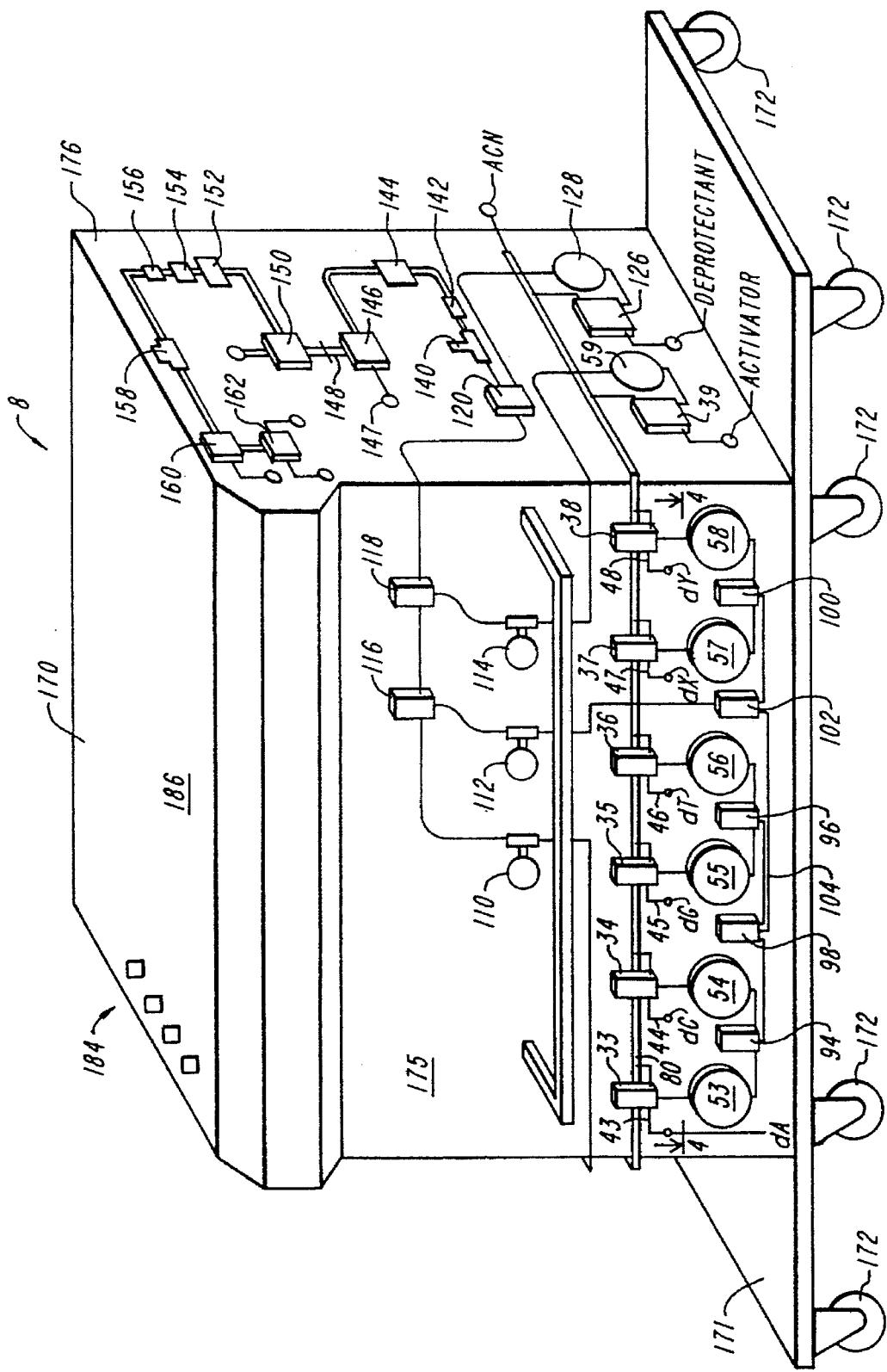
FIG. 3 is a representative pictorial view of the machine of the present invention.

Referring to the pictorial perspective view in FIG. 3, the pumps, valves, and sensors described above are mounted to the exterior of a stainless steel cabinet 170. Cabinet 170 includes a lower platform 171 supported by wheels 172 that provide mobility when desired.

Valves 33–38 are mounted in a row at a first vertical height across a lower portion of front panel 175 of cabinet 170, and pumps 53–58 are mounted in a row at a second vertical height that is below the first vertical height. The pumps are directly underneath the respective valves 33–38 that receive the amidites. A valving arrangement that includes valves 94–102 for selecting from among the six amidites is mounted slightly below pumps 53–58. The valving arrangement for selecting a liquid from among all of the outputs of the sensors and the deprotectant, namely valves 116, 118, and 120, are mounted such that valves 116 and 118 are mounted to the front of the cabinet over the sensors, and valve 120 is mounted on a side wall 176 of the cabinet.

Figure 4:
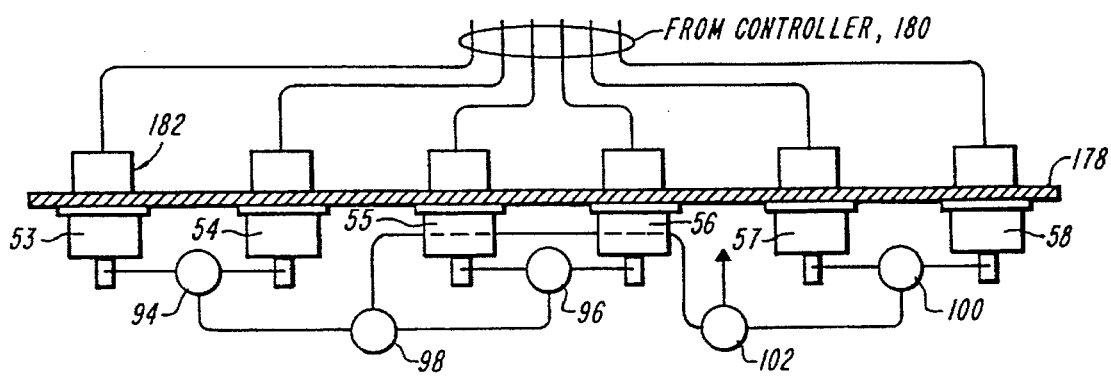
FIG. 4 is a cross-sectional view taken along section lines 4—4 in FIG. 3.

Referring to FIG. 4, a portion of the pump and valve arrangement is illustrated in cross-section. As shown here, pumps 53–58 have external portions through which liquid is provided on one side of wall 78, and motor portions 182 on the interior side of front panel 175. The motors are coupled to the controller (which is remote from cabinet 120) through signal wires 180. With this arrangement, the liquids and the electrical signals are isolated from each other by panel 175. While shown for only pumps 53–58, this type of isolation by mounting on cabinet 170 also applies to pumps 50–52, 59, and 128.

Referring again to FIG. 3, electrical, communication, and pneumatic inputs ports 184 are mounted in a top panel 186 of cabinet 170. One port is for receiving a power supply cable, one is for a relay contact for a remote alarm, one is for providing an uninterruptable power supply alarm input, and one is for receiving the instrument air supply through a hose.

Figure 5:
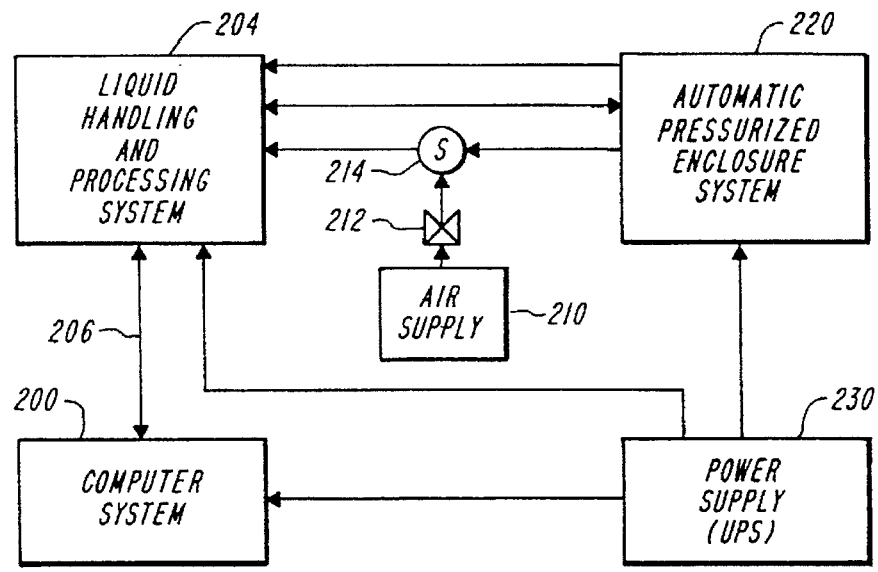
FIG. 5 is a block diagram of a control system according to the present invention.

Referring to FIG. 5, as indicated above, a controller receives signals from the various sensors and provides control signals to the valves and pumps. These controller functions are implemented with a personal computer system 200 such as a Compaq DeskPro XE, programmed with appropriate control software. Computer system 200 is coupled to liquid handling and processing system 204, which includes cabinet 170 and the attached components of FIG. 3, through fiberoptic cable 206 with fiberoptic modems at each end. This fiberoptic communication allows multiplexing while electrically isolating the components from the computer system. Computer system 200 thus receives signals from the sensors in system 204, including flow sensors 110, 112, 114, and 156; UV monitors and transmitters 144, 152, 154; pressure transmitter 140; and air sensor 142; and provides the drive signals that activate the valves and pumps.

Air for pneumatically activating the various three-way valves in system 204 is provided from an air supply 210, and through a valve 212 and a solenoid 214. This air supply is also coupled to circulate air within cabinet 170 with an automatic pressurized enclosure system 220, such as a Model 4R2100 produced by H. Ruf Gmbh. During start-up, an equivalent of six internal cabinet volumes of air is purged at a high flow rate from cabinet 170. During operation, air is continuously purged at a low flow rate to create a slightly higher pressure inside the cabinet than outside.

The various components of the system are connected to, and thus powered by, an uninterruptable power supply (UPS) 230.

Figure 6:
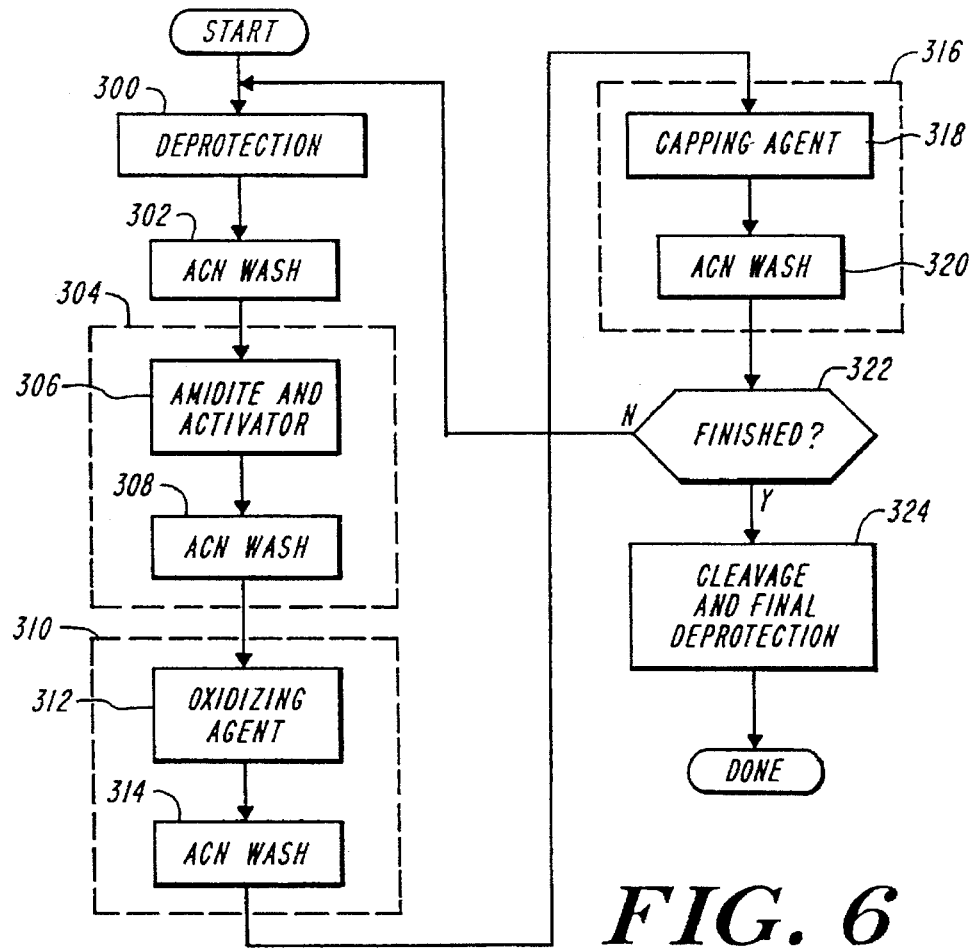
FIG. 6 is a flow chart of a method for synthesizing oligonucleotides.

Machine 8 thus produces oligonucleotides using a phosphoramidite process as indicated in the flow chart of FIG. 6. This process begins after column 151 has been coupled to the machine, a support has been provided in the column, a first DMT-protected nucleoside is attached to the support and the containers with various liquids have been fluidly coupled to the machine. A sequence of steps for adding an amidite is described below. In this example, the next amidite to be provided is deoxycytosine.

Figure 2:
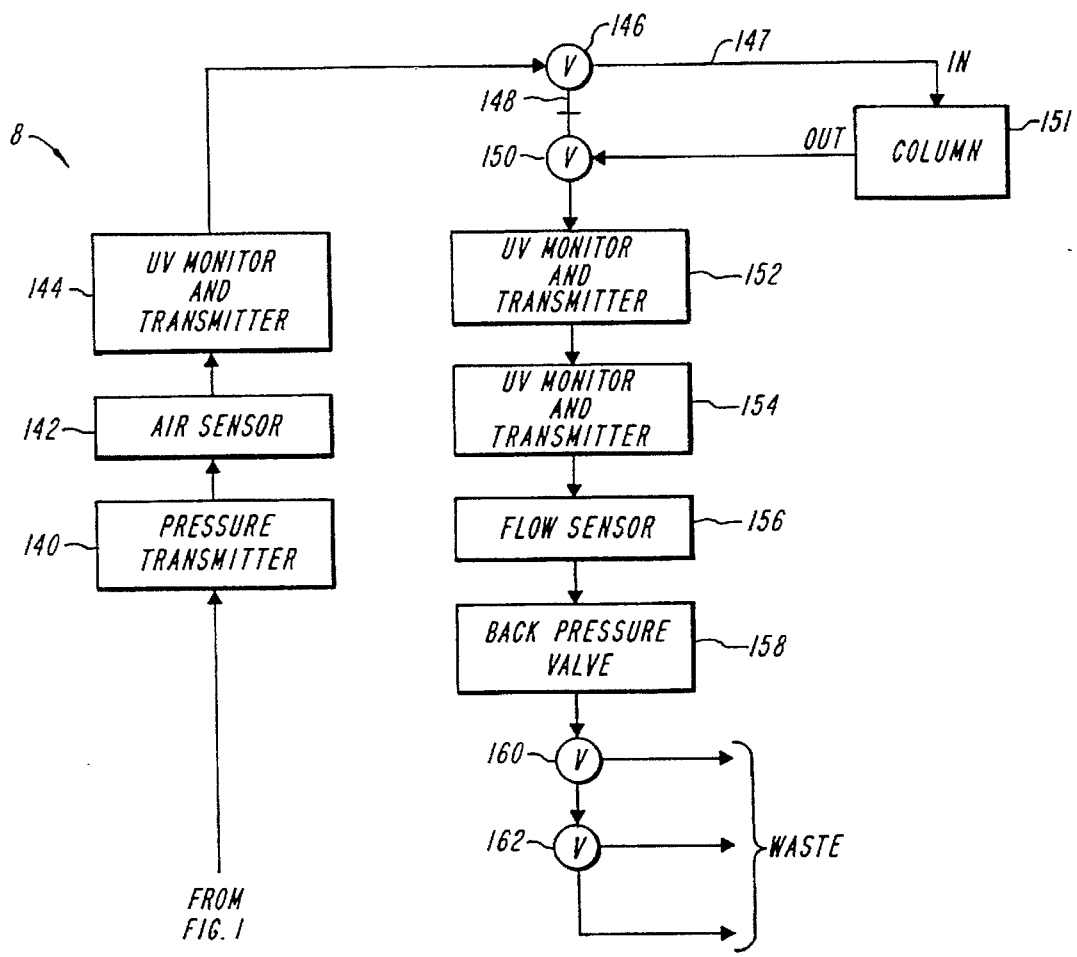

Referring to FIGS. 1 and 2, the support-bound DMT-protected nucleotide is first deprotected (Step 300). The deprotectant is provided from container 124 through valve 126, higher rate pump 128, to valve 120. Valve 120 is switched to receive liquid only from pump 128 and not from valve 118, and to provide the liquid through the various sensors to valve 146 and then to column 151. Monitor and transmitter 154 senses when a first threshold amount of DMT displaced from the column is exceeded, and when the displaced DMT falls below a second threshold amount. The volume of the liquid flow is sensed with sensor 156. Sensor 156 is not actually measuring just deprotectant when it is regulating pump 128, because other liquids are in the column and in various conduit when the deprotectant is first introduced. Rather, sensor 156 measures some quantity of whatever liquid is flowing through it. Since the displaced liquid is equal in volume to the introduced liquid, this measurement effectively determines the amount of deprotectant that is introduced.

The deprotectant is then flushed with ACN through valve 126, pump 128, valve 120, etc., along the same path as deprotectant 124 (Step 302).

The next step is a step for compiling a next nucleoside (Step 304). The dC from container 12 is provided along with the activator from container 26 (Step 306). The computer switches valve 34 to receive amidite from container 12, while the inlet port coupled to conduit 74 is closed. The computer causes dC to be pumped by pump 54 to a first inlet port of valve 94, while the inlet port to valve 94 from pump 53 is closed. Each of valves 98 and 102 is also open only at one port to receive liquid from valve 94 and valve 98, respectively. Flow sensor 112 senses the flow of liquid and provides a signal to the controller, which then causes valve 34 to switch to ACN when the amount of amidite that passes through sensor 112 is sufficient. In a preferred embodiment, the amount is sufficient when there are 50% more nucleosides (on a molar basis) than the number of oligonucleotides being produced in the column, i.e., 1.5 molar equivalents of nucleoside. In determining this amount, the controller takes into consideration that pump 54 has a certain amount of start-up time before it reaches its desired rate, and therefore integrates the pump rate to accumulate the amount of liquid. Valve 116 is then set to receive liquid through sensor 112, and to provide that liquid to an inlet port of valve 118.

Meanwhile, valve 116 receives activator from container 26 through valve 39, pump 59, and sensor 114. Both ports of valve 116 are kept open so that the dC and the activator are mixed together in valve 116 and are provided together to one inlet of valve 118. Pumps 54 and 59 for pumping dC and activator, respectively, can operate at the same rate for a 50—50 mix, or pump 59 may be operated faster to provide a 60–40 mix. The combination is provided to a first inlet port of valve 120, while a second inlet port, that is coupled to flow sensor 110 to receive capping agent, oxidizing agent, or ACN, is closed.

The dC and activator are then provided through pressure transmitter 140, air sensor 142, and UV monitor and transmitter 144, and to an inlet port of valve 146. Valve 146 then provides the dC and activator to the column. The dC and activator are pumped together at a rate that ensures a desired contact time, e.g., one minute from the beginning of the time when the activated dC contacts the nascent oligonucleotide sequence until the time when the flow of dC is past the column.

The dC and activator is then provided to the monitors and transmitters. The amount of nucleoside sensed on the inlet and outlet sides of column 151 with monitors and transmitters 144 and 152 is checked to make sure that a sufficient quantity of amidite is being consumed. If not enough amidite is consumed, the controller causes more amidite to be added, e.g., about 0.5 molar equivalents.

When a sufficient amount of dC and activator has been pumped and sensed, valves 34 and 39 are switched to receive ACN from conduits 74 and 79, respectively (Step 308). The amount of ACN that is selected is sufficient to clear the conduits of remaining dC and activator up through column 151. Since the liquid flows continuously, valves 34 and 39 are actually switched while dC and activator are still passing through the column and through the waste outputs.

Next is an oxidation step (Step 310), in which an oxidizing agent is introduced through valve 32, pump 52, valve 92, sensor 110, etc. By switching valve 32 to receive ACN, the oxidizing agent is then washed out (Step 314).

When a sufficient amount of ACN has been used to flush the lines of the oxidizing agent, the capping step (Step 316) is provided by introducing capping agents, Cap A and Cap B, pumped at equal rates with pumps 50, 51 and mixed together in valve 90. The mixture is provided to the column through valve 92, sensor 110, valve 118, valve 120, pressure transmitter 140, air sensor 142, UV monitor and transmitter 144, and valve 146 (Step 318). As discussed above, the capping agent blocks the previously unreacted hydroxyls on the support, except for the hydroxyl protected with DMT.

After a sufficient amount of capping agent is provided, it is flushed out with ACN from container 82 (Step 320). The ACN is introduced through conduits 70, 71 to valves 30, 31 from which it is pumped by pumps 50, 51 and then is provided through valve 90, etc., following the same path as the Cap A and Cap B.

If, at this time, the oligonucleotide is not finished (Step 322), the steps are repeated. If the oligonucleotide is finished, the support-bound fully-protected oligonucleotide is removed from column 151, dried, and treated with a cleavage and deprotecting agent, such as ammonium hydroxide, to cleave the oligonucleotide from the support and to remove the various protecting groups.

It has been found that up to 100 millimoles of the oligonucleotides can be produced with a machine according to the present invention. The machine allows these oligonucleotides to be produced more efficiently by carefully metering and monitoring the liquids with individually associated pumps. With larger quantities liquids used to make this larger number of oligonucleotides, the more efficient use of materials is particularly important.

Having described a preferred embodiment of the present invention, it should be apparent that other modifications can be made without departing from the scope of the invention as defined by the appended claims. For example, while specific components have been named by example, it should be understood that these are examples and that other models or types of such components can be used. While the machine has been described for use with a phosphoramidite method, the amidites can be replaced with other monomers if the machine is used to synthesize oligonucleotides with a different method.

What is claimed is:

1. A machine for synthesizing oligonucleotides with a flow-through process, the machine for fluid connection to containers to receive different types of monomers, for providing the monomers to a reaction vessel one type at a time, and for receiving liquid displaced from the reaction vessel, the machine comprising:

a plurality of monomer pumping modules, each of the pumping modules associated with one of the different types of monomers, each pumping module including an inlet port for receiving the associated monomer, a valve, a pump for pumping the associated monomer, and an outlet port for providing the associated monomer;

a controllable valving arrangement fluidly coupled to the outlet ports of the plurality of monomer pumping modules for selecting one of the monomers from among the plurality of modules, and for providing the selected monomer for introduction to the reaction vessel; and a controller for controlling the plurality of monomer pumping modules and the controllable valving arrangement.

2. The machine of claim 1, further comprising a flow sensor fluidly coupled to receive the selected monomer from the controllable valving arrangement and for providing a sensor signal to the controller.

3. The machine of claim 2, wherein the controller uses the signals from the flow sensor to regulate the pumps.

4. The machine of claim 1, wherein the valve in each of the plurality of pumping modules has a port for receiving a flushing agent, the valve being controllable to select between the associated monomer and the flushing agent.

5. The machine of claim 1, further comprising a cabinet defining an interior and an exterior of the machine, wherein the pumping modules are mounted to the cabinet of the machine.

6. The machine of claim 5, wherein each pump has a first end for receiving liquid and a second end for receiving a signal for controlling the pump, each pump being mounted to extend through the cabinet such that the first end is in the interior of the machine and the second end is at the exterior of the machine.

7. The machine of claim 6, further including a gas purging system for purging a gas through the interior of the cabinet.

8. The machine of claim 7, wherein the valves are pneumatically activated, the gas purging system supplying air for activating the valves.

9. The machine of claim 1, further including a gas purging system for purging a gas through the interior of the cabinet.

10. The machine of claim 1, the machine having a pump for pumping a deprotectant for removing a protecting group from a nucleotide.

11. The machine of claim 10, further comprising a protecting group sensor for sensing the protecting group removed from the reaction vessel, the controller controlling the pump for pumping the deprotecting agent in response to the protecting group sensor.

12. The machine of claim 1, further comprising a capping valve having a first inlet part for receiving a first capping agent, and a second inlet for receiving a second capping agent.

13. The machine of claim 12, wherein the first and second inlet ports of the capping valve can be kept open at the same time to mix the first and second capping agents.

14. The machine of claim 1, further comprising a mixing valve having a first port for receiving the selected monomer and a second port for receiving an activator, wherein the first and second inlet ports can be kept open at the same time to mix the selected monomer and the activator in the mixing valve.

15. The machine of claim 14, wherein the controller controls the percent mixture of the selected monomer and the activator.

16. The machine of claim 1, wherein the valves are pneumatically activated, the machine further including an air purging system, the controller controlling the valves by controlling the air purging system.

17. A machine for synthesizing oligonucleotides with a flow-through process, the machine for fluid connection to containers to receive different types of monomers, for providing the monomers to a column one type at a time, and for receiving liquid displaced from the column, the machine comprising:

a plurality of pumps, each of the pumps being associated with one of the different types of monomers;

a controllable valving arrangement fluidly coupled to the outlet ports of the plurality of pumps for selecting one of the monomers from among the plurality of pumps, and for providing the selected monomer for introduction to the column;

a flow sensor for sensing the volume of the flow of monomers; and a controller for receiving signals from the sensor and for controlling the plurality of pumps and the controllable valving arrangement.

18. A machine for synthesizing oligonucleotides with a flow-through process, the machine for fluid coupling to containers to receive different types of monomers, for providing the monomers to a column one type at a time, and for receiving liquid displaced from the column, the machine comprising:

a cabinet defining interior and exterior regions;

a network of valves and pumps for receiving as inputs the different types of monomers and for providing a selected monomer to the column, the valves and pumps being mounted to the cabinet such that liquids are pumped and circulated in the exterior region; and a gas purging system coupled to the cabinet for purging gas through the interior region of the cabinet.

19. The machine of claim 18, wherein each of the pumps are mounted to extend partway through the cabinet, parts of the pump handling liquids being in the exterior region, parts of the pump for receiving electrical signals being in the interior region.

20. The machine of claim 18, wherein the valves are actuated with a gas input, the gas purging system being fluidly coupled to the valves.

* * * * *